May 26, 1953 K. H. OTTE 2,639,828
EXTRACTING DEVICE FOR BAKERY PRODUCTS
Filed Dec. 30, 1946 5 Sheets-Sheet 1
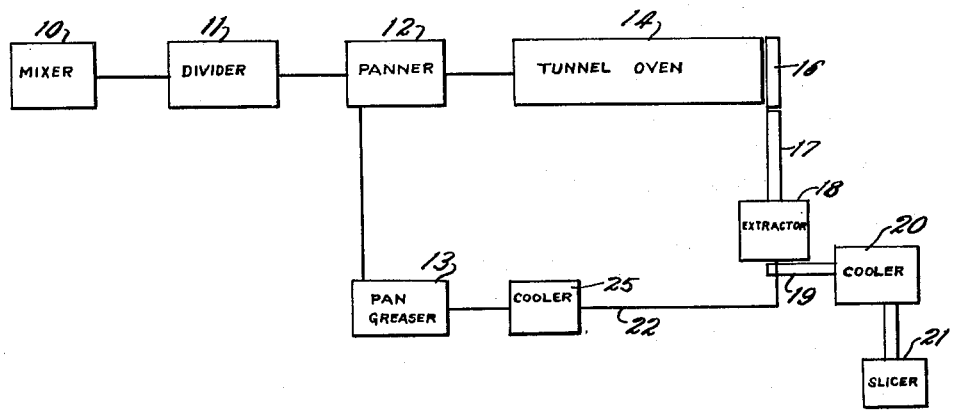
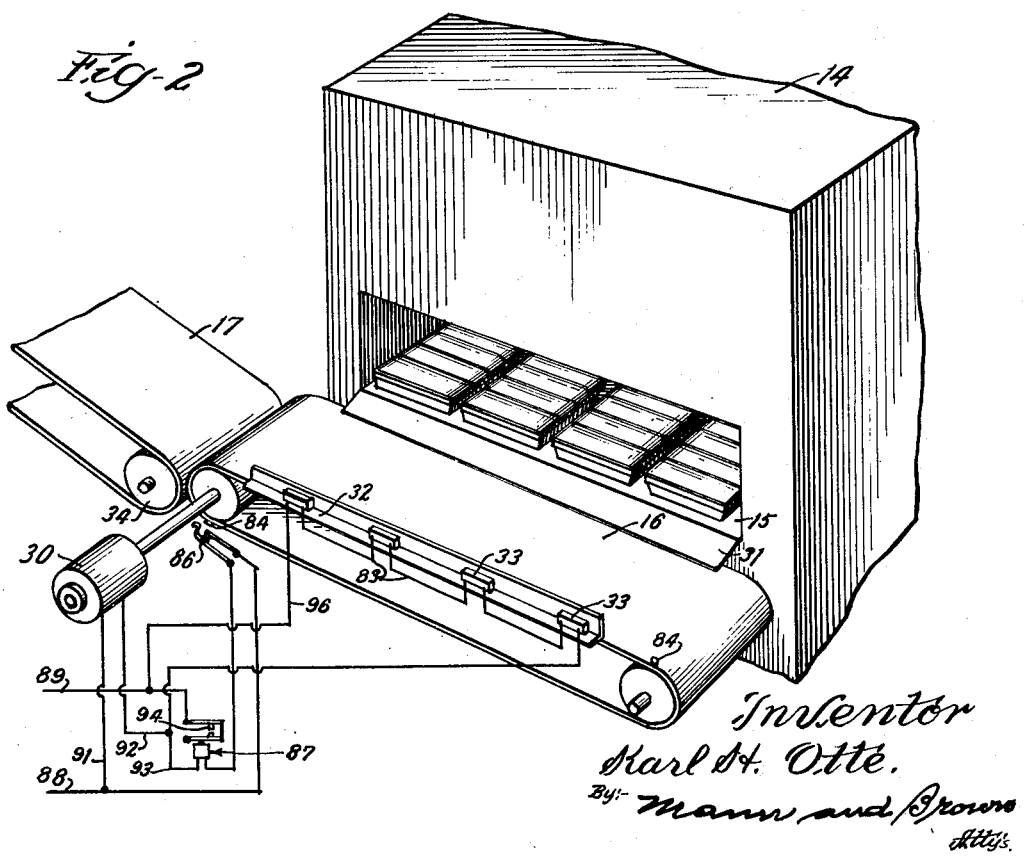
Inventor
Karl H. Otte.
By:- Mann and Brown
Attys.

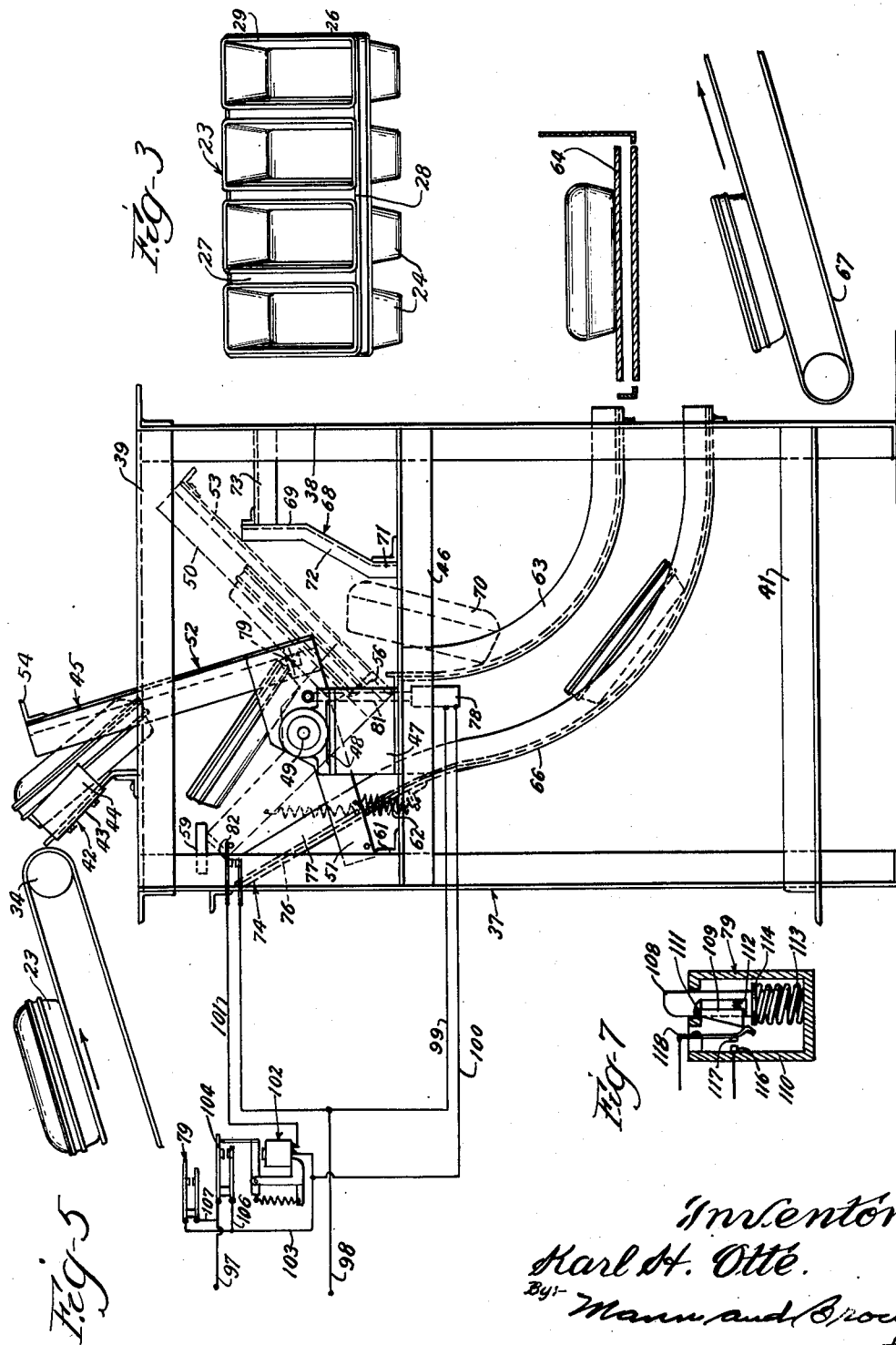

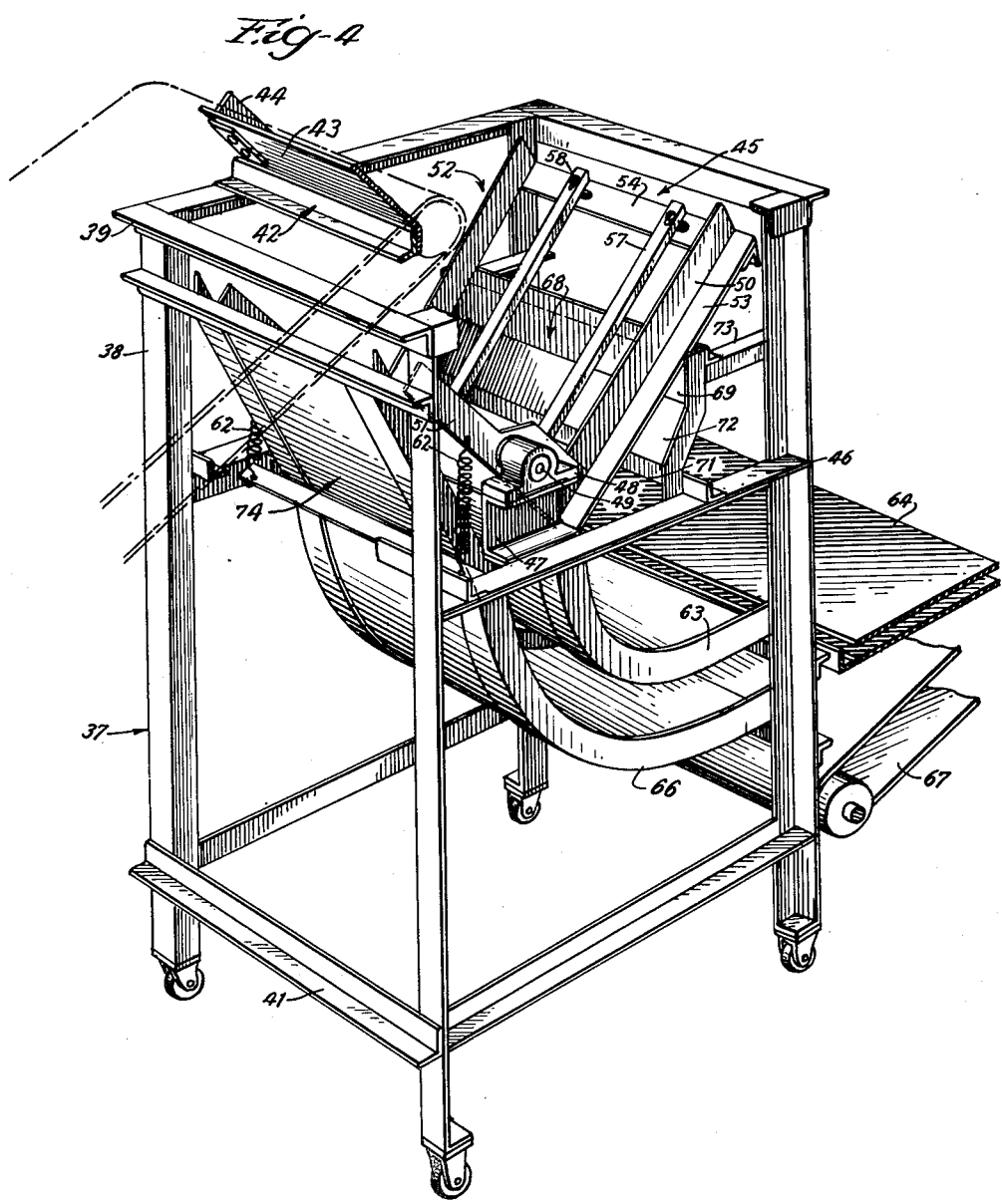

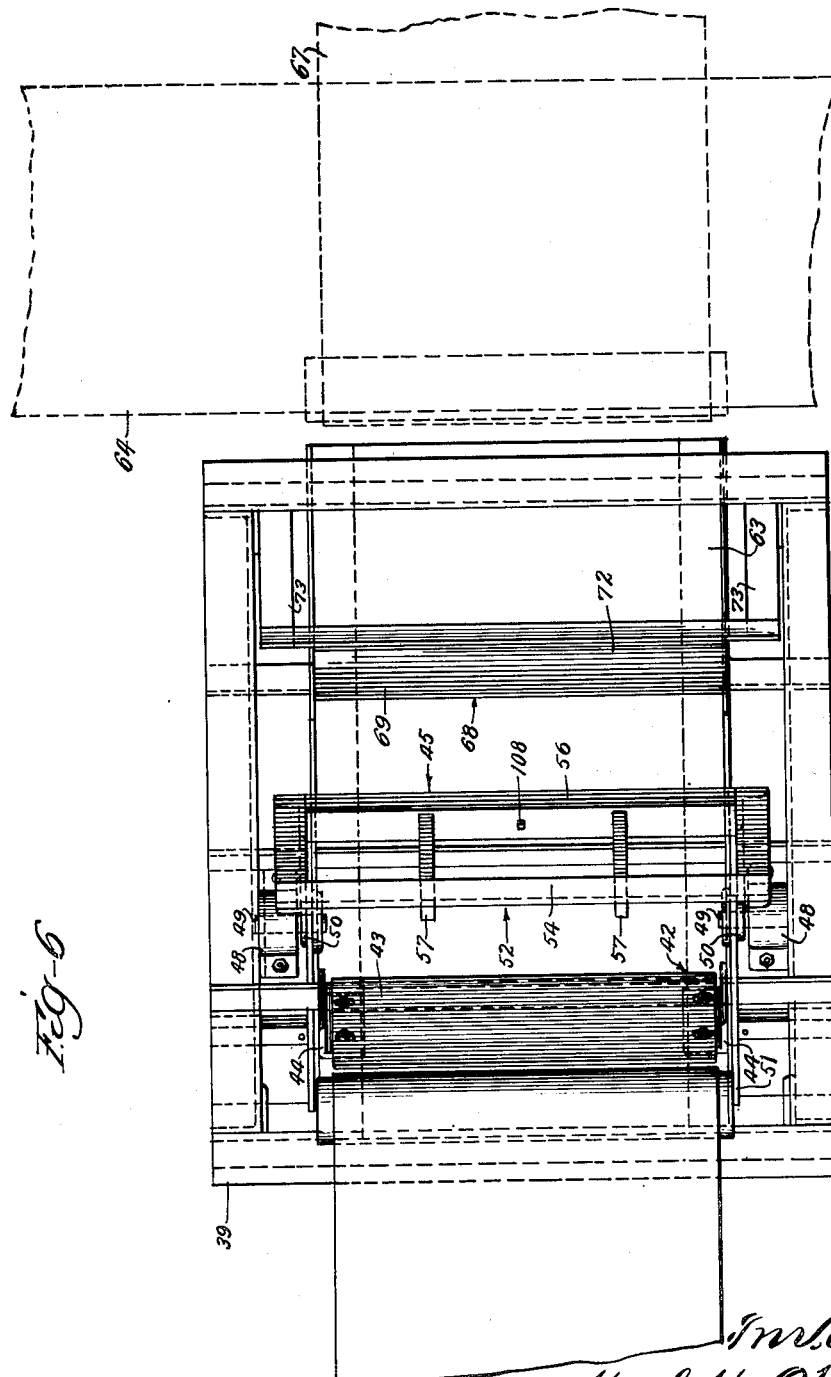

May 26, 1953   K. H. OTTE   2,639,828
EXTRACTING DEVICE FOR BAKERY PRODUCTS
Filed Dec. 30, 1946   5 Sheets-Sheet 5
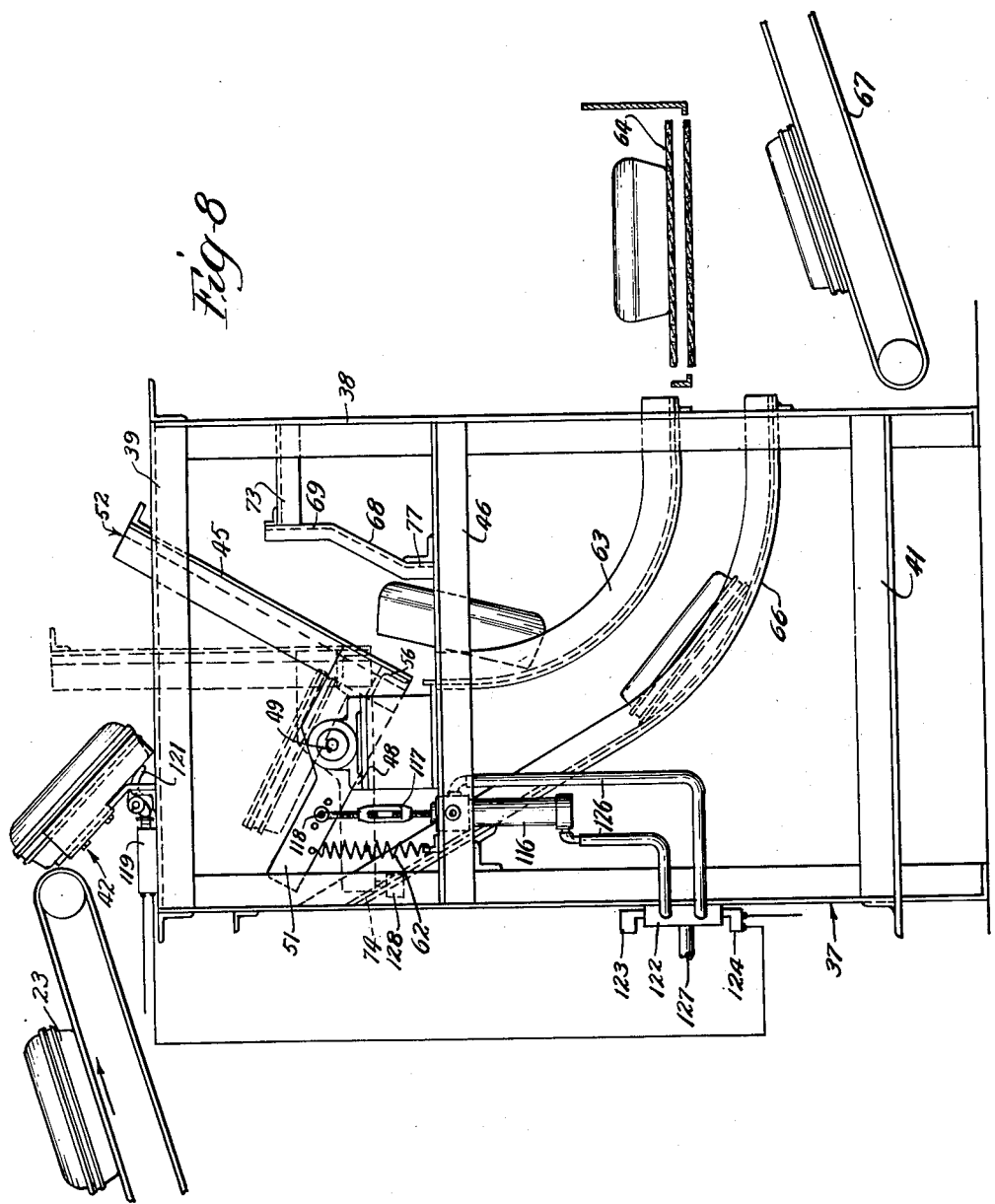
Inventor
Karl H. Otte.
By:- Mann and Brown
Attys.

Patented May 26, 1953

2,639,828

UNITED STATES PATENT OFFICE 2,639,828

EXTRACTING DEVICE FOR BAKERY PRODUCTS

Karl H. Otte, Chicago, Ill., assignor to Purity Bakeries Service Corporation, a corporation of Illinois Application December 30, 1946, Serial No. 719,267

12 Claims. (Cl. 214—308)

My invention is directed to an apparatus for automatically extracting bakery products such as bread from containers and is particularly well adapted for use in conjunction with other automatic machinery currently employed in modern bakeries.

My extractor performs the work previously requiring the employment of one or more men, who were stationed at or near the discharge end of a bakery oven to remove the bread or other bakery goods from their containers. To extract bread from pan sets, often consisting of four individual containers joined together, the man grasps the pan set, lifting and partially inverting it, and, if necessary, raps it sharply against a stationary object to jar loose the contents.

This extraction operation is preferably performed while the container and contents are hot from the oven to avoid possible difficulty in extraction, and the men therefore usually work near the oven where the ambient temperature is high. Since the pan sets are also hot, and weigh up to 16 pounds, it is obvious that even the most experienced men will require frequent relief.

An object of my invention is to provide a machine for automatically removing bakery products such as bread and the like from containers and delivering the empty containers and products separately to subsequent operations. Other objects include the provision of a device of the type described capable of operating with or without the application of power, which is simple, inexpensive, and durable, and which by simple adjustment will handle many sizes and shapes of containers.

These and other objects will become apparent from the following specification and from the drawings in which Figure 1 is a diagrammatic representation of the flow sheet of a modern bakery incorporating my device;

Figure 2 is a partial perspective view of the discharge end of the bakery oven;

Figure 3 is a perspective view of a pan set;

Figure 4 is a partially sectioned perspective view of my device;

Figure 5 is a partially sectioned diagrammatic side view of my device;

Figure 6 is a top view of my device;

Figure 7 is a diagrammatic section through a switch; and

Figure 8 is a diagrammatic side view of a modified form of my device;

Since bread constitutes probably the most important single item produced by bakeries, the following description will be confined largely to a bread-extracting machine with the knowledge that in the light of my disclosure those skilled in the art will be able to modify my device in obvious ways to adapt it more specifically to other less important products.

Bread, as well as other similar products, will often fall freely from an inverted container, but a certain number of containers will require a jar or impact to loosen the contents even when the container is inverted. The preferred forms of my extractor, therefore, provide means for impacting or jarring filled containers, although this feature may be omitted if an increased number of unextracted containers is for any reason unobjectionable in the cycle of operation. Briefly, the objects of my invention are accomplished by dropping or otherwise conveying filled containers to a tilting frame in which the container is momentarily supported in a partially inverted position. The impact or jar caused by the container striking the frame, or by movement of the frame itself, loosens the bread which is permitted to fall through the frame and directed into a chute. The frame is then tilted to another position, causing the empty container to fall from the frame to a pan chute after which the frame returns to its initial position. If a light weight frame is employed, the force of the falling container may be utilized to move the frame through its cycle, but I may employ air cylinders, solenoids, or similar means to produce a more rapid and positive frame movement.

The relationship of my extractor to some of the other machines customarily employed in modern bakeries is illustrated in Figure 1 in which it may be seen that flour, water and other ingredients may be added to a mixer 10 which prepares the dough. The dough is delivered from the mixer 10 to a divider 11 where it is cut into suitably sized and shaped segments ready for delivery to a panner 12. The panner deposits the segments of dough received from the divider 11 in pan sets 23 received from a pan greaser 13 and delivers them to an oven such as a tunnel conveyer or tray oven, generally designated 14, in which the dough is baked. The baked loaves are discharged from the oven 14 to a conveyer 16 which in turn delivers the pan sets 23 with their contents to an extractor conveyer 17. The conveyer 17 delivers the filled pan sets to my extractor, generally designated 18, where the bread is removed from the containers. The bread is then led by a conveyer 19 to a cooler 20 and subsequently to a slicer and wrapper 21. The empty pans from the extractor are led by a suitable conveyer 22 to a cooler 25, or the like, then to the pan greaser 13 and finally back to the panner 12, repeating the cycle.

As indicated in Figure 3, the pan sets, generally designated 23, may, for example, be built up from four pans 24, usually having tapered side walls, and joined by a band 26 extending circumferentially around the upper edges 28 and ends 29 of the pans. Spacers 27 are provided between the pans in order to provide a stable structure and separate the pans 24. Substantially any number of containers may be combined into sets, the actual number not being critical. Tops or covers may also be used in baking, but must be removed before extraction.

After being filled with dough by the panner 12 the pan sets are placed on a conveyer 15 in the oven 14 in edge-to-edge relationship as indicated in Figure 2. The ovens employed may, for example, be approximately 60 feet long, capable of handling four pan sets abreast and require from 15 to 35 minutes to perform the baking operation. As the pans fall from the discharge end of the oven conveyer 15, they are guided by an apron 31 inclined from the oven conveyer 15 to the conveyer 16. The conveyer 16 is driven by a motor 30 which is controlled by normally open switches 33, connected in series, and mounted on a stop board 32 disposed opposite the oven on the upper run of the conveyer 16. The switches 33 are positioned to be contacted and closed by the pan sets 23 sliding down the apron 31. The switches 33 are connected in series by wires 83 in such manner that when all the switches are closed, the circuit to the motor 30 is completed. It is, of course, necessary that the number of switches 33 be equal to the number of rows of pan sets on the oven conveyer 15 and that the conveyer 16 operate for a sufficient length of time to deliver all of the pan sets in one row to the conveyer 17, subsequently stopping to receive the pan sets in the next succeeding row on the oven conveyer 15.

Various means may be employed to obtain this sequence of operation. For example, cams 84 may be secured to the conveyer belt to trip a normally closed switch 86 connected in series between the coil of a relay 87 and one of a pair of wires 88 and 89 which lead to a suitable source of electric current. A wire 91 from the motor 30 is connected to wire 88 and a second wire 92 from the motor 30 is connected to a wire 93 which is connected to the switches 33, the coil of relay 87, and to one of a pair of normally open contacts 94 of the relay 87. A wire 96 completes the circuit from the switches 33 to the wire 89. Closing the switches 33 therefore completes the circuit through wires 88, switch 86, coil of relay 87, wire 93, switches 33, wire 96, and wire 89, thus energizing the motor 30 and closing the contacts 94. The contacts 94, when closed, connect the wire 93 to the wire 89 and are held closed by the coil of relay 87 until one of the cams 84 momentarily opens the contacts of switch 86 thus breaking the circuit to the relay 87. Opening of the switches 33 during the operation of the conveyer 16, therefore, does not break the circuit to the motor 30.

The conveyer 17 running over end rollers 34 carries the filled pan sets to the top of my extractor or depanning station 18 which has a frame 37 of suitable material such as angle iron, it being understood that the conveyers 16 and 17 operate at predetermined speeds, the speed of conveyer 17 being the greatest in order to insure the existence of a predetermined minimum spacing between pan sets 23 on the conveyer 17. The frame 37 may include four legs 38 connected by upper and lower horizontal connecting members 39 and 41, respectively. An inclined guide 42 having a base plate 43 and side plates 44 extends transversely across the upper horizontal connecting members 39 immediately below the upper end of the conveyer 17. If desired, the guide may be adjustably secured to members 39 by suitable bolts extending through slots formed in the guide 42 and the members 39 although for ordinary use such adjustment has been found unnecessary.

On an intermediate horizontal member 46 secured to legs 38 I attach channel-shaped sections 47 to the upper surfaces of which is secured pillow blocks 48. Stub shafts 49 are journaled in the pillow blocks 48 and are rigidly attached to arms 51 which constitute part of an L-shaped, tilting or oscillating frame, generally designated 52. The frame includes a bed or rack 45, extending laterally from arms 51 at approximately 90° in an upward direction. The bed 45 is formed of angle iron legs 53 connected at the top by a cross member 54 and at the bottom by an impact member 56. Spaced intercepter bars 57, parallel to legs 53, are adjustably secured by bolts 58 which extend through transverse slots in the impact member 56 and cross member 54.

Since the filled container is to be intercepted in its fall from the guide 42 by the impact member 56 and be supported at east temporarily by the bed 45, flanges 50 of the angle iron legs 53 extend upwardly, and are spaced apart a distance somewhat in excess of the maximum length of a pan set. Similarly, one flange of the impact member 56, which is also formed of angle iron extends outwardly in the same direction.

To limit the degree of movement of the frame 52, an upper stop 59 is secured to legs 38 and a lower stop 61 also secured to the legs 38 may be provided to intercept the arms 51, thus limiting the arcuate movement of the bed 45 as required by various sizes of pan sets. A spring 62 is attached to the intermediate cross member 46 and to the arms 51 normally urging the frame 52 into its furthest counterclockwise position in which the legs 53 are approximately minus 15° from the vertical. This places the upper portion of the legs 53, in most instances, almost directly above the axes of the shafts 49, and the center of gravity of the frame 52 slightly to the right as in Figure 5, of the axes of the shafts 49.

The frame 52 is unbalanced, since the bed 45 outweighs the arms 51 and is displaced laterally from the axes of the shafts 49. The spring 61 should therefore be only slightly stronger than necessary to normally hold the frame in its furthermost counterclockwise position as shown by solid lines in Figure 5.

As the filled pan sets 23 are delivered at spaced intervals by the conveyer 17 they are received by the guide 42 and slide downwardly. The position and slope of the guide 42 is such that an edge 28 of the pan set is made to strike the impact member 56 of the frame 52, moving the frame in a clockwise direction and loosening the bread in the containers. The pan set tilts in a clockwise direction with the frame 52, the spacers 27 of the pan set coming in contact with the intercepter or knock-out bars 57 of the frame, thus preventing contact between the contents of the pan and the bed 45. As the frame continues to move in a clockwise direction, the arms 51 come in contact with the upper stop 59 with somewhat of a jar thus permitting the bread to fall through the intercepter bars 57 into a chute 63 for delivery to a suitable bread conveyer 64. Movement of the frame 52 in a clockwise direction places the spring 62 under tension so that as the weight of the bread is removed, the frame rotates in a counterclockwise direction until the arm 51 comes in contact with the lower stop 61. The intercepter bars 57 being still in contact with the spacers 27 of the pan set 23 force the pan to tilt with the frame 52 permitting the pan set 23 to fall rearwardly from the impact member 56 into a suitable pan chute 66 from which it is delivered to a pan conveyer 67.

To insure that the bread, generally designated 70, upon discharge from the pan set 23 will fall bottom side down in the chute 63, I provide a deflector plate 68 comprising spaced upper and lower vertical members 69 and 71 respectively, connected by an inclined member 72 and supported by arms 73 secured to the frame 37. The deflector 68 is disposed immediately below and to the right of the tilting frame 52 (Figure 4) in such manner and position as to intercept the upper end of the loaf 70 as it falls from the pan set. This forces the loaf 70 to fall lower end first into the chute 36 thus insuring its delivery to the conveyer 64 in proper position.

Both the bread chute 63 and the pan chute 66 are of conventional design, having side walls, and shaped to receive bread or pan sets in a substantially vertical position from the frame 52, and deliver them to a side of the machine right side up in horizontal positions. A pan set deflector 74 is also provided on the left side of the frame 52 (Figure 4) to receive and guide the pan set 23 falling from the tilting frame 52. The pan set deflector 74 may suitably comprise a plate 76 having side members 77, secured to legs 38 and intermediate horizontal connecting member 46 at an angle adapted to intercept the upper bottom end of pan set 23 as it falls from the frame 52. The lower end of the pan deflector 74 communicates with the chute 66 thus insuring delivery of the empty pan set 23 to the conveyer 67 in proper position.

Changes in the type of bread manufactured may necessitate minor adjustments of my device. For example, if larger loaves are manufactured and only three pans are used in a set, the position of the intercepter bars must of course be adjusted to contact the spacers on the pan sets. The spring 62 may be replaced or tension-adjusting means provided in order to accommodate the changes in weight occasioned by change in the type of loaf being baked. In addition, weights may be added to the frame 52, secured by bolts 58, to alter the balance of the frame 52.

It is of course necessary in the sequence of operations above described that the mass of the pan set 23 and its contents be sufficiently great, with respect to the weight of the tilting frame 52, to produce the desired movement, and the frame 52 may therefore be formed of light weight metal, such as aluminum, if desired. However, where more than one type of pan set is employed, I prefer to use power means such as an air cylinder or a solenoid to move the frame 52 through its cycle. For example, a switch 79 may be secured to the impact member 56, as indicated in Figure 5, and connected to a solenoid 78 suitably mounted on the intermediate horizontal connecting member 46. The solenoid 78 has a plunger 81 connected to one of the arms 51 in such manner as to produce the desired arcuate movement of the frame 52. The solenoid may act to force the frame 52 through its entire cycle, or in one direction only, the circuit to the solenoid being completed as a pan set closes switch 79 and subsequently broken by the action of arms 51 on switch 82, which may be disposed near either the upper or lower stop depending on the type of solenoid employed.

In the form illustrated, the solenoid moves the frame 52 in a clockwise direction only against the force of spring 62, and the switch 82 is therefore disposed near the upper stop 59.

One form of circuit for securing the desired sequence of operations is shown in Figures 5 and 7 and includes a pair of wires 97 and 98 connected to a suitable source of electric current. Wire 98 is connected by wire 99 to solenoid 78 and to switch 82, wire 100 connecting the solenoid 78 to a wire 103. A wire 101 leads from the switch 82 to the coil of a holding relay 102 and wire 103 from the coil of the relay 102 to switch 79. Normally open contacts 104 of the relay 102 are connected to wire 97 and by wire 106 to wire 103, the other contacts of switch 79 being also connected to the wire 97 by a wire 107. The switch 79 may include a housing 110 in which a plunger 108 is reciprocably mounted. A pawl 109 is pivotally secured to the plunger 108 by transverse pin 111 and is urged outwardly by a spring 112 disposed between the pawl and the plunger. A spring 113 around the plunger 108 acts against the housing 110 and against a collar 114 to resiliently urge the plunger outwardly. A fixed contact 116 is secured to the housing 110, its mating contact 117 being held in a normally open position and supported by a resilient arm 118 which is secured at one end to the housing 110. The pawl 109 may be triangular in shape and disposed in such manner that as the plunger 108 is forced downwardly by a pan set 23 falling on the impact member 56, the pawl 109 engages a projecting portion of the resilient arm 118 and momentarily closes the circuit through the contacts 116 and 117, but as the plunger returns upwardly, the pawl 109 is moved inwardly by the arm 118 and the contacts 116 and 117 are not closed. Thus the pan set 23, falling on the impact member 56, closes the circuit through switch 79 only momentarily. This permits current to flow through wire 98, normally closed switch 82, wire 101, the coil of relay 102, wire 103, switch 79, wire 107, and wire 97 completing the circuit to the solenoid 78 through wires 99 and 100. As the switch 79 is energized, the coil of relay 102 closes the contacts 104 so that the circuit will remain energized regardless of the condition of switch 79 until the switch 82 is opened by the arm 51. This will occur when the frame is in the position shown in dotted lines in Figure 5. The spring 62 then moves the frame to the position shown in solid line, the plunger 108 of the switch 79 remaining depressed by the now empty pan set during this portion of the cycle. As the pan falls from the impact member 56, the plunger 108 of the switch 79 rises and the circuit is automatically reset for operation.

When a solenoid is employed, it is obvious that little, if any, adjustment in the balance of frame 52 will be required, and therefore a greater range of products may be extracted without the necessity of adjustment.

Figure 8 illustrates a modified form of my device employing an air cylinder 116 to actuate the tilting frame 52. The air cylinder 116 may be pivotally secured to member 46 and provided with a piston arm 117 of adjustable length pivotally secured at one end to a stud 118, or the like, on one of the arms 51. Several studs 118 may be provided on one of the arms 51 for adjustment of the position of frame 52. Springs 62 are provided to counterbalance the frame 52. A switch 119 having a finger 121 may be mounted in any convenient location, as for example, near guide 42 in such position that a pan set 23 will move finger 121 to actuate the switch 119, which controls the air cylinder 116.

In this modification the starting position of the frame 52 is shown in solid lines in Figure 8 with the bed 45 disposed at an angle to a vertical plane in its furthermost position of clockwise movement. A pan set 23, passing through the guide 42, actuates switch 119, and continues down to the impact member 56 on frame 52. In most instances the frame 52 will be just starting its counterclockwise movement at the moment of impact, but it is not essential that this occur, since either the impact produced by falling or by movement of the frame on the pan set 23 is sufficient to loosen the contents and permit the bread to fall through the frame 52 into the bread chute 63.

The frame 52 continues its counterclockwise movement to approximately the position indicated by dotted lines in Figure 8 at which point the air cylinder 116 abruptly reverses the direction of movement returning the frame 52 to starting position. The empty pan set 23 pivots in falling about the edge of the impact member 56, and in this form does not strike the pan deflector 74, which is either moved outwardly or eliminated to permit the pan set to strike the pan chute 66 bottom side up. This is usually preferable to the form shown in Figure 5 since the pan sets are delivered to the pan conveyor 67 bottom side up ready for greasing.

There are many well known methods for obtaining the desired cycle of operation of the frame 52. For example, I may employ an air control valve 122 controlled by solenoids 123 and 124 which functions to admit and exhaust compressed air alternately to each side of a piston within cylinder 116 through tubes 126, the compressed air entering the valve 122 through inlet 127. Switch 119 is suitably connected to solenoid 124, which actuates valve 122 and causes the frame 52 to be moved in a counterclockwise direction. A switch 128, mounted for actuation by arms 51, is connected to solenoid 123, which reverses the control valve 122 causing the cylinder 116 to return the frame 52 to starting position.

It is considered that a container is "inverted" when it is turned beyond the position in which the top face thereof is in a vertical plane. The term "partially inverted" is to differentiate between the situation when the container is "wholly inverted," i. e., when the container is turned with the top side downwards in a horizontal plane, but in no instance is the container considered to be even at least partially inverted until the top side has passed the vertical position.

From the foregoing it should not be understood that I wish to limit myself specifically to the details herein described since obviously many changes may be made therein without departing from the true spirit and scope of my invention. I therefore desire to limit myself only to the extent defined in the appended claims.

I claim:

1. In a depanning device for removing loaves of bread from the pans in which they are baked, the combination of a conveyor for conveying pans of bread in a forward direction to a depanning station, and means associated with the conveyor for inverting and dumping the pans of bread as they are delivered to the depanning station, said means including a frame pivoted along an axis transverse to the line of movement of the conveyor and having openings therein large enough for a loaf of bread to pass through but not large enough for the pans to pass through, said means also including means for sharply arresting movement of the pans as they move downwardly in an inverted position whereby the loaves of bread fall through the opening in the frame while the pans remain therein.

2. In a depanning device for removing loaves of bread from the pans in which they are baked, the combination of a conveyor for conveying pans of bread in a forward direction to a depanning station, means associated with the conveyor for inverting and dumping the pans of bread as they are delivered to the depanning station, said means including a frame pivoted along an axis transverse to the line of movement of the conveyor and having openings therein large enough for a loaf of bread to pass through but not large enough for the pans to pass through, said means also including means for sharply arresting movement of the pans as they move downwardly in an inverted position whereby the loaves of bread fall through the opening in the frame while the pans remain therein, means to rotate said frame about its axis to a position causing discharge of the emptied pans therefrom in righted position, and means for righting the loaves of bread and moving them away from the depanning station.

3. A device for extracting bread from a plurality of spaced pans connected to form a pan set including a rack rotatable about an axis between a first and second position, said rack having at least one knock-out bar to engage an edge of the set between adjacent pans, an impact member attached to the rack at substantially right angles thereto, said rack in the second position being substantially vertical with the impact member at the lower end thereof, means to drop a pan set containing bread with an upper edge of the set facing the knock-out bar and with a side thereof facing the impact member whereby the set will be arrested with a jar upon contact with the impact member, means to rotate the rack to the first position wherein the pan is inverted and to impart an impact to said set while in the inverted position, and means to rotate the rack to the second position to re-invert the set.

4. A device for extracting bread and the like from open-top baking containers including a support, an L-shaped frame, one of the legs of said frame being pivotally connected to the support, the other of the legs forming a rack adapted to allow the passage of bread therethrough while preventing the passage of the container, an impact member on said frame between the pivotal axis and the rack, a guide to drop a container with a side thereof against the impact member and with the open-top facing the rack, and a resilient member one end of which is connected to the frame and the other end of which is connected to the support, said member being adapted to exert a moment greater than the moment of the frame and an empty container and less than the moment exerted by the frame and a filled container whereby a filled container striking the impact member will induce rotation of the frame to invert the container and allow the contents thereof to fall through the rack whereupon the resilient means will cause a reverse rotation of the frame.

5. A device for extracting bread and the like from open-top baking containers including a support, an L-shaped frame, one of the legs of said frame being pivotally connected to the support, the other of the legs forming a rack adapted to allow the passage of bread therethrough while preventing the passage of the container, an impact member on said frame between the pivotal axis and the rack, a guide to drop a container with a side thereof against the impact member and with the open-top facing the rack, control means responsive to the impact of a container on the impact member, and means actuated by the control means for rotating the frame to invert the container with the top edge thereof against the rack.

6. In a depanning device for removing loaves of bread from the pans in which they are baked, the combination of a conveyor for conveying pans of bread lengthwise and in a forward direction to a depanning station, and means associated with the conveyor for inverting the pans in a given direction and dumping the pans of bread as they are delivered to the depanning station, said means including a frame adapted to receive each pan and pivoted about an axis transverse to the line of movement of the conveyor, means for sharply arresting movement of each pan as it is being moved in an inverted position to thereby cause the bread to be dislodged from the pan, said frame having an opening therein large enough for a loaf of bread to pass through but not large enough for the pans to pass through, an inclined chute positioned at the depanning station and adapted to receive bread as it is dislodged from said pans and falls through the opening in the frame while the pans remain therein, and bread-intercepting means positioned in the path of the bread as it is dislodged from the pans and adapted to stop further rotation of the bread in said given direction and cause it to rotate in the opposite direction for delivery to said chute in a righted position.

7. In a depanning device for removing loaves of bread from the pans in which they are baked, the combination of a conveyor for conveying pans of bread lengthwise and in a forward direction to a depanning station, and means associated with the conveyor for inverting the pans in a given direction and dumping the pans of bread as they are delivered to the depanning station, said means including a frame adapted to receive each pan and pivoted about an axis transverse to the line of movement of the conveyor, means for sharply arresting movement of each pan as it is being moved in an inverted position to thereby cause the bread to be dislodged from the pan, said frame having an opening therein large enough for a loaf of bread to pass through but not large enough for the pans to pass through, an inclined chute positioned at the depanning station and adapted to receive bread as it is dislodged from said pans and falls through the opening in the frame while the pans remain therein, bread-intercepting means positioned in the path of the bread as it is dislodged from the pans and adapted to stop further rotation of the bread in said given direction and cause it to rotate in the opposite direction for delivery to said chute in a righted position, and means for delivering the emptied pans from the depanning station in a righted position.

8. In a depanning device for removing loaves of bread from the open-top pans in which they were baked, the combination of a conveyor for conveying pans of bread in a forward direction to a depanning station, and means associated with the conveyor for inverting and dumping the pans of bread as they are delivered to the depanning station, said means including a pivotally mounted frame adapted to move with the pans along a curvilinear path with the open end of the pan foremost, a portion of said frame movable with the pan during at least a portion of its movement along said curvilinear path and adapted to engage a top portion of the pan adjacent the bread, said frame having an opening therein large enough for a loaf of bread to pass through but not large enough for the pan to pass through, said means also including means for arresting said portion of said frame in the line of movement of said pan to stop the movement of the pan with a jar as it moves downwardly in an inverted position, thereby loosening the bread from the pan and permitting the momentum of the bread to carry it from the pan and through the opening in the frame while the pans remain therein.

9. In a depanning device for removing loaves of bread from the open-top pans in which they were baked, the combination of a conveyor for conveying pans of bread in a forward direction to a depanning station, and means associated with the conveyor for inverting and dumping the pans of bread as they are delivered to the depanning station, said means including a pivotally mounted frame adapted to move the pan with the open end foremost and to invert the pan, a portion of said frame movable with the pan in a given direction during at least a portion of its movement to inverted position and adapted to engage the top portion of the pan adjacent the bread, said frame having an opening therein large enough for a loaf of bread to pass through but not large enough for the pans to pass through, said means also including means for arresting said portion of said frame in the line of downward movement of the pan in its inverted position to stop the movement of the pan with a jar, thereby loosening the bread from the pan and permitting the bread to fall from the pan through the opening in the frame while the pan remains therein, and means to move said portion of the frame in the opposite direction to reinvert the pan after the discharge of the bread from the pan.

10. A device for extracting bread and the like from open-top baking containers including a support, a pair of L-shaped brackets, one of the legs of each bracket being pivotally connected to the support, an impact member extending between said brackets and connected to said brackets contiguous to the intersection of the legs of each bracket, a cross member connected between the other legs of said brackets, and a knock-out bar connected between said cross member and impact member, said other legs of said brackets, cross member, impact member, and knock-out bar forming a rack adapted to allow the passage of bread therethrough while preventing the passage of the container.

11. A device for extracting bread and the like from open-top baking containers including a support, a pair of L-shaped brackets, one of the legs of each bracket being pivotally connected to the support, an impact member extending between said brackets and connected to said brackets contiguous to the intersection of the legs of each bracket, a cross member connected between the other legs of said brackets, a knock-out bar connected between said cross member and impact member, said other legs of said brackets, cross member, impact member, and knock-out bar forming a rack adapted to allow the passage of bread therethrough while preventing the passage of the container, and a guide to drop a container with a side thereof against the impact member and with the open top facing the rack.

12. A device for extracting bread and the like from open-top baking containers including a support, a pair of L-shaped brackets, one of the legs of each bracket being pivotally connected to the support, an impact member extending between said brackets and connected to said brackets contiguous to the intersection of the legs of each bracket, a cross member connected between the other legs of said brackets, a knock-out bar connected between said cross member and impact member, said other legs of said brackets, cross member, impact member, and knock-out bar forming a rack adapted to allow the passage of bread therethrough while preventing the passage of the container, a guide to drop a container with a side thereof against the impact member and with the open top facing the rack, whereby the force of the pan striking the impact member will induce arcuate movement of the brackets, means for limiting said movement, and means for moving the brackets in a direction opposite to the direction of induced movement.

KARL H. OTTE.

References Cited in the file of this patent

UNITED STATES PATENTS

| Number | Name | Date |
|---|---|---|
| 1,295,195 | Parker | Feb. 25, 1919 |
| 1,427,679 | Eggert | Aug. 29, 1922 |
| 1,452,711 | Schroeder | Apr. 24, 1923 |
| 1,473,996 | McGarry | Nov. 3, 1923 |
| 1,561,664 | Rathwell | Nov. 17, 1925 |
| 1,967,719 | Morgan | July 24, 1934 |
| 2,268,220 | Marshall | Dec. 30, 1941 |
| 2,344,664 | Adams | Mar. 21, 1944 |
| 2,524,656 | Eyster | Oct. 3, 1950 |